US008798466B2

(12) United States Patent
Sato

(10) Patent No.: US 8,798,466 B2
(45) Date of Patent: Aug. 5, 2014

(54) OPTICAL PACKET SWITCHING SYSTEM

(75) Inventor: Reiko Sato, Kawasaki (JP)

(73) Assignee: Fujitsu Telecom Networks Limited, Kanagawa (JP)

(*) Notice: Subject to any disclaimer, the term of this patent is extended or adjusted under 35 U.S.C. 154(b) by 118 days.

(21) Appl. No.: 13/332,117

(22) Filed: Dec. 20, 2011

(65) Prior Publication Data

US 2012/0155862 A1    Jun. 21, 2012

(30) Foreign Application Priority Data

Dec. 20, 2010 (JP) .................................. 2010-283499

(51) Int. Cl.
*H04B 10/00*    (2013.01)

(52) U.S. Cl.
USPC .................................. 398/45; 398/51; 398/54

(58) Field of Classification Search
USPC .......................................... 398/51, 54, 58, 59
See application file for complete search history.

(56) References Cited

U.S. PATENT DOCUMENTS

| 5,170,273 | A | * | 12/1992 | Nishio | 398/48 |
| 5,598,491 | A | * | 1/1997 | Ohya et al. | 385/24 |
| 6,005,698 | A | * | 12/1999 | Huber et al. | 398/50 |
| 6,069,718 | A | * | 5/2000 | Khaleghi | 398/27 |
| 6,424,757 | B1 | * | 7/2002 | Sparks et al. | 385/16 |
| 6,510,260 | B2 | * | 1/2003 | Chen et al. | 385/17 |
| 6,810,211 | B1 | * | 10/2004 | Castanon | 398/47 |
| 7,103,283 | B2 | * | 9/2006 | Mikami et al. | 398/159 |
| 7,106,967 | B2 | * | 9/2006 | Handelman | 398/47 |
| 7,146,100 | B2 | * | 12/2006 | Osaka | 398/30 |
| 7,171,119 | B2 | * | 1/2007 | Kuroyanagi et al. | 398/50 |
| 7,177,540 | B2 | * | 2/2007 | Inoue et al. | 398/16 |
| 7,286,755 | B1 | * | 10/2007 | Goodwill et al. | 398/26 |
| 7,317,873 | B2 | * | 1/2008 | Aoki | 398/45 |
| 7,359,645 | B2 | * | 4/2008 | Miyashita et al. | 398/147 |
| 7,450,856 | B2 | * | 11/2008 | Yoshimoto et al. | 398/159 |
| 7,522,836 | B2 | * | 4/2009 | Islam | 398/48 |
| 7,864,757 | B2 | * | 1/2011 | Hall et al. | 370/388 |
| 8,116,315 | B2 | * | 2/2012 | Posey, Jr. | 370/395.31 |
| 8,121,475 | B2 | * | 2/2012 | Kagawa | 398/9 |
| 8,170,416 | B2 | * | 5/2012 | Kai et al. | 398/45 |
| 8,301,025 | B2 | * | 10/2012 | Krummrich | 398/26 |
| 8,326,148 | B2 | * | 12/2012 | Bergman et al. | 398/51 |
| 8,582,984 | B2 | * | 11/2013 | Kai | 398/196 |
| 8,638,801 | B2 | * | 1/2014 | Sato | 370/395.51 |
| 2002/0024706 | A1 | * | 2/2002 | Meli | 359/173 |

(Continued)

FOREIGN PATENT DOCUMENTS

| JP | 2007-259333 A | 10/2007 |
| JP | 2008-235986 | 10/2008 |
| JP | 2009-182920 A | 8/2009 |

OTHER PUBLICATIONS

Office Action dated Dec. 17, 2013 issued by the JPO for a corresponding Japanese Patent Application No. 2010-283499 and English Translation, 4 pages.

*Primary Examiner* — Agustin Bello
(74) *Attorney, Agent, or Firm* — Christie, Parker & Hale, LLP

(57) ABSTRACT

An optical packet switching system includes: an optical packet switching device configured to route and output an input optical packet signal; an optical amplifier device provided in a stage subsequent to the optical packet switching device; and a control signal generation unit configured to superimpose a noise component on the optical packet signal by inducing cross talk in the optical packet switch.

5 Claims, 6 Drawing Sheets

(56) References Cited

U.S. PATENT DOCUMENTS

| | | | |
|---|---|---|---|
| 2002/0149812 A1* | 10/2002 | Hong et al. | 359/110 |
| 2004/0184820 A1* | 9/2004 | Ohishi et al. | 398/200 |
| 2005/0201675 A1* | 9/2005 | Knopp et al. | 385/27 |
| 2005/0213986 A1* | 9/2005 | Yoshimoto et al. | 398/147 |
| 2005/0244164 A1* | 11/2005 | Miyashita et al. | 398/147 |
| 2006/0159454 A1* | 7/2006 | Bjornstad | 398/51 |
| 2006/0222361 A1* | 10/2006 | Aoki | 398/51 |
| 2008/0285971 A1* | 11/2008 | Liboiron-Ladouceur et al. | 398/45 |
| 2009/0016712 A1* | 1/2009 | Kagawa | 398/9 |
| 2009/0238574 A1* | 9/2009 | Sone | 398/139 |
| 2009/0274459 A1* | 11/2009 | Takita | 398/48 |
| 2010/0123945 A1* | 5/2010 | Kai | 359/239 |
| 2011/0116798 A1* | 5/2011 | Kai | 398/58 |
| 2012/0155862 A1* | 6/2012 | Sato | 398/27 |
| 2012/0155869 A1* | 6/2012 | Sato | 398/45 |

\* cited by examiner

TIME

OPTICAL PACKET SWITCHING SYSTEM

CROSS-REFERENCE TO RELATED APPLICATION

This application claims priority to and the benefit of Japanese Patent Application Number 2010-283499, filed on Dec. 20, 2010.

BACKGROUND OF THE INVENTION

1. Field of the Invention

The present invention relates to an optical packet switching system in which packet-by-packet optical packet switching is enabled by driving an optical switch according to routing information assigned to an optical packet signal.

2. Description of the Related Art

The technology of switching the path depending on the wavelength in an optical transmission system based on wavelength division multiplexing (WDM) and by employing a wavelength selective switch (WSS) is in practical use. One of the next-generation technologies studied is an optical packet switching system in which the path is switched in smaller units, namely, IP packets (10 Gigabit Ethernet (registered trademark) signals, etc.). Each packet is converted in format into an optical packet and routed by using an ultrahigh-speed optical switch (see e.g., patent document No. 1).

When the transmission is based on IP packets, no significant information is transmitted absent any data so that the bandwidth is wasted accordingly. If the optical packet switching system is realized, however, any idle time in which data is absent can be occupied by another packet. Therefore, the optical packet switching system promises the possibility of dramatically increasing the bandwidth usage efficiency of the transmission path and is envisaged as a technology of the future.

[patent document No. 1] JP 2008-235986

An erbium doped fiber amplifier (EDFA) is an essential optical device in a WDM system. When the distance of transmission or the number of switching stages is increased, resultant loss need be compensated by using an EDFA. The same holds true of the optical packet transmission system.

FIGS. 1A and 1B are graphs comparing an optical signal in optical path transmission and an optical packet signal in optical packet transmission. FIG. 1A shows an optical signal in optical path transmission, and FIG. 1B shows an optical packet signal in optical packet transmission. In the case of optical path transmission, the mark ratio of 50% of an optical signal transmitted is constantly guaranteed. Therefore, the average optical power remains constant. In contrast, in the case of an optical packet, the packet length varies for each packet. Therefore, a time period during which an optical signal occurs and a time period during which an optical signal does not occur are created. In this specification, "packet density" is defined as an indicator of a ratio by which an optical signal occurs. A packet density is defined by packet length/packet interval. The packet density of an optical signal in optical path transmission 100%. If the packet density varies, the average value of optical power varies. For example, when the packet density drops from 50% to 5%, the average optical power drops by 10 dB, neglecting the power occurring in the absence of an optical signal.

FIGS. 2A and 2B are graphs comparing extinction ratios of optical packet signals occurring before and after optical switching. FIG. 2A shows an optical packet signal input to an optical switch, and FIG. 2B shows an optical packet signal output from the optical switch. The extinction ratio of an optical transmitter for transmitting an optical packet signal differs depending on the transmitter configuration. Generally, the extinction ratio is about 8-20 dB. Meanwhile, the extinction of an optical switch is generally 30 dB or more, which is higher than that of an optical transmitter. Accordingly, the extinction ratio of an optical packet signal output from an optical switch is significantly higher than the ratio occurring before the signal is input, as shown in FIGS. 2A and 2B. As a result, variation in the average optical power of an optical packet signal occurring after the signal is output from the optical switch is larger than the variation occurring before the signal is input to the optical switch.

Normally, the carrier relaxation time of an EDFA is on the order of msec. Therefore, an EDFA cannot control the gain of each optical packet, which lasts on the order of nsec or μsec. Thus, an EDFA controls the gain based on the average optical power obtained by averaging over duration on the order of msec. Therefore, large variation in the average optical power caused by variation in packet density or an optical switch characterized by high extinction ratio is a factor that may result in large fluctuation in the gain of an EDFA. As fluctuation in the gain of an EDFA increases, the peak power of an optical power signal output from the EDFA varies significantly even if the peak power of an optical packet signal input to the EDFA remains constant. This might adversely affect the bit error rate characteristics of the optical receiver for receiving the optical packet signal. The term "peak power" as used in this specification means an optical power level occurring when an optical signal represents "1".

SUMMARY OF THE INVENTION

The present invention addresses the background described above and a purpose thereof is to provide an optical packet switching system capable of mitigating variation in the peak power of an optical packet signal.

An optical packet switching system that addresses the aforementioned challenge comprises: an optical packet switching device configured to route and output an input optical packet signal; an optical amplifier device provided in a stage subsequent to the optical packet switching device; and a noise superimposition device configured to superimpose noise on an optical packet signal prior to input to the optical amplifier device.

The noise superimposition device may superimpose a noise component on an optical packet signal by inducing cross talk in the optical packet switching device.

The noise superimposition device may control the amount of cross talk based on bit error rate information detected by the light receiver device for receiving an optical packet signal from the optical amplifier device.

The noise superimposition device may control the amount of cross talk so that the bit error rate detected by the optical receiver device is equal to or lower than a predetermined threshold value.

The noise superimposition device may superimpose ASE noise on an optical packet signal prior to input to the optical amplifier device.

The noise superimposition device may control the amount of ASE noise superimposed on an optical packet signal based on a bit error rate detected by the optical receiver device for receiving an optical packet signal from the optical amplifier device.

The noise superimposition device may control the amount of ASE noise so that the bit error rate detected by the optical receiver device is equal to or lower than a predetermined threshold value.

Another embodiment of the present invention also relates to an optical packet switching system. The system comprises: an optical packet switching device configured to route and output an input optical packet signal; an optical amplifier device provided in a stage subsequent to the optical packet switching device; and a dummy packet insertion device configured to insert a dummy packet in an optical packet signal prior to input to the optical amplifier device.

A dummy packet may include a flag indicating that the packet is a dummy packet, and the optical packet switching device may refer to the flag to identify a dummy packet, discard, when the dummy packet and a legitimate optical packet signal compete, the completing dummy packet, and route the legitimate optical packet signal.

The optical packet switching system may further comprise: an optical receiver device configured to receive an optical signal output from the optical amplifier device, wherein the optical receiver device may refer to the flag to identify a dummy packet and discard the dummy packet.

The optical packet switching device may refer to the flag to identify a dummy packet, discard all dummy packets before routing the optical packet signal, and insert a dummy packet again.

The optical packet switching device may route a legitimate optical packet signal along with a dummy packet that follows.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

A description will now be given of the optical packet switching system according to an embodiment of the present invention.

First Embodiment

Figure 3:
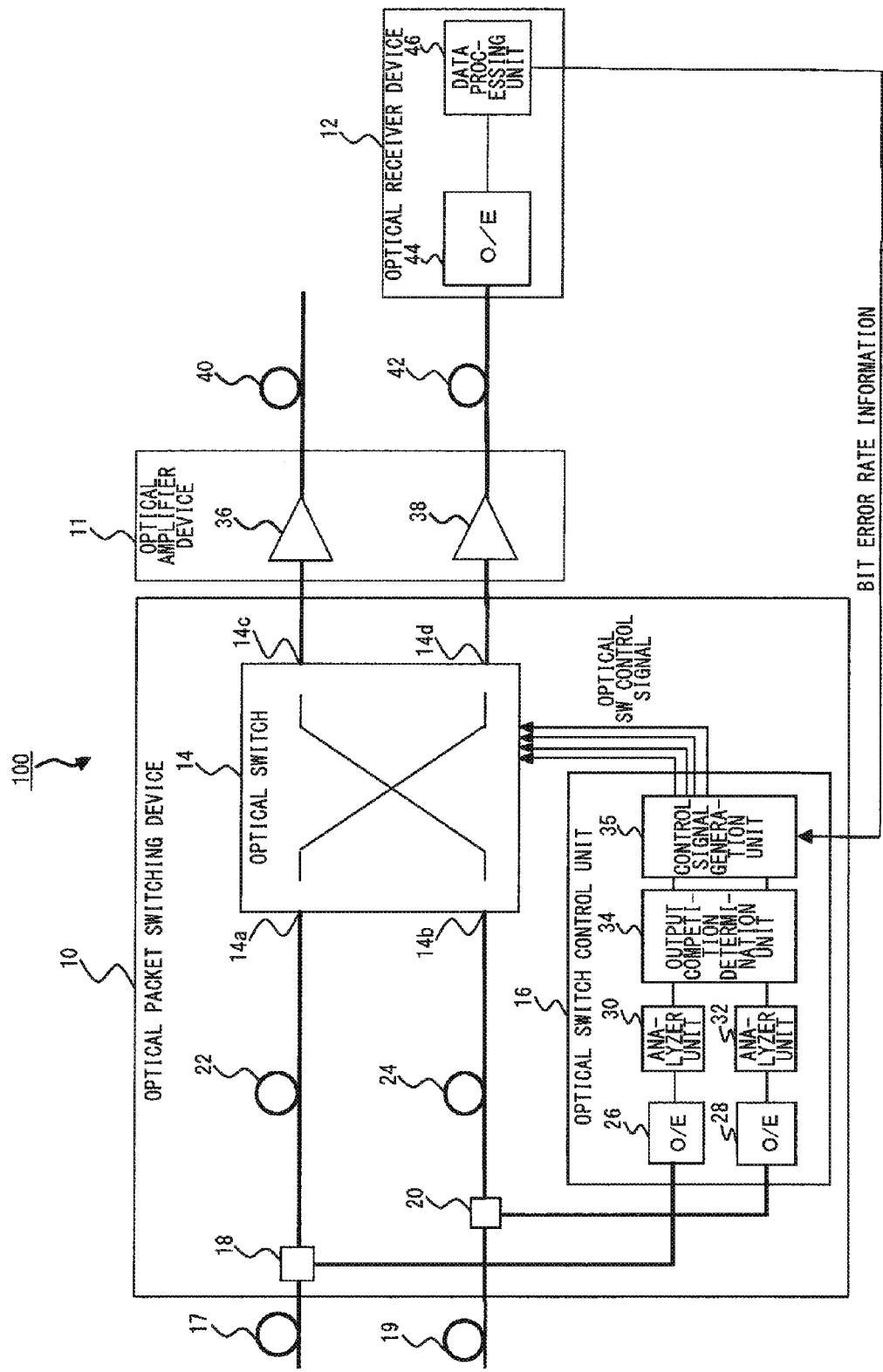
FIG. 3 shows an optical packet exchange system according to the first embodiment of the present invention.

FIG. 3 shows an optical packet exchange system according to the first embodiment of the present invention. As shown in FIG. 3, an optical packet exchange system 100 comprises a 2-input×2-output optical packet switching device 10, an optical amplifier device 11, and an optical receiver device 12.

The optical packet switching device 10 is provided with the function of switching the path of, i.e., routing, an input optical packet signal and outputting the signal accordingly. As shown in FIG. 3, the optical packet switching device 10 comprises an optical switch 14, an optical switch control unit 16, a first optical coupler 18, a second optical coupler 20, a first optical delay line 22, and a second optical delay line 24.

The optical packet signal input to the optical packet switching device 10 via a optical transmission path 17 is input to the first optical coupler 18. The first optical coupler 18 causes the optical packet signal to branch into two signals. One of the optical packet signal from the branch is input to a first input port 14a of the optical switch 14 via the first delay line 22. The other optical packet signal is input to the optical switch control unit 16.

An optical packet signal input to the optical packet switching device 10 via another optical transmission path 19 is input to the second optical coupler 20. The second optical coupler 20 causes the optical packet signal to branch into two signals. One of the optical packet signals from the branch is input to a second input port 14b of the optical switch 14 via the second delay line 24. The other optical packet signal is input to the optical switch control unit 16.

The optical switch control unit 16 extracts routing information from the input optical packet signal and outputs a control signal to the optical switch 14 in accordance with the routing information. As shown in FIG. 3, the optical switch control unit 16 is provided with a first optical/electrical converter unit 26, a second optical/electrical converter unit 28, a first analyzer unit 30, a second analyzer unit 32, an output competition determination unit 34, and a control signal generation unit 35.

The first optical/electrical converter unit 26 converts an optical packet signal received from the first optical coupler 18 into an electrical signal. The second optical/electrical converter 28 converts an optical packet signal received from the second optical coupler 20 into an electrical signal.

The first analyzer unit 30 analyzes the header of the packet signal received from the first optical/electrical converter 26 and detects the routing information. The second analyzer unit 32 analyzes the header of the packet signal received from the second optical/electrical converter 28 and detects the routing information.

The output competition determination unit 34 determines whether the optical packet should be transmitted or discarded based on the result of header analysis in the first analyzer unit 30 and the second analyzer unit 32. For example, it will be assumed that optical packets are input to the first input port 14a and the second input port 14b and that the destination of output of the two optical packets is the first output port 14c. In this case, the output competition determination unit 34 determines whether the two optical packets compete. In other words, the output competition determination unit 34 determines whether the two optical packets concur in time. If the two optical packets compete, the optical packet arriving first is transmitted and the following optical packet is discarded.

The control signal generation unit 35 generates an optical switch control signal for controlling on/off of the optical switch 14 based on the result of determination in the output competition determination unit 34 and outputs the generated signal to the optical switch 14. The detailed operation of the control signal generation unit 35 will be described later.

The first optical delay line 22 and the second optical delay line 24 delay the optical packet signals for a duration required for the optical switch control unit 16 to generate an optical switch control signal. By providing the first optical delay line 22 and the second optical delay line 24, on/off of the optical switch 14 can be controlled to be synchronized with the timing of arrival of the optical packet signals at the optical switch 14.

The optical switch 14 is controlled to be turned on or off by an optical switch control signal from the optical switch control unit 16 and routes and outputs the input optical packet signal. For example, the optical switch 14 may be implemented by a semiconductor optical amplifier (SOA). In this embodiment, the optical switch 14 is a 2×2 optical switch and so comprises four SOA gates (not shown). In other words, the first SOA gate (not shown) is provided between the first input port 14a and the first output port 14c, the second SOA gate (not shown) is provided between the first input port 14a and the second output port 14d, the third SOA gate (not shown) is provided between the second input port 14b and the first output port 14c, and the fourth SOA gate (not shown) is provided between the second input port 14b and the second output port 14d.

The optical amplifier device 11 is provided in a stage subsequent to the optical packet switching device 10 and comprises a first EDFA 36 and a second EDFA 38. The optical packet signal output from the first output port 14c of the optical switch 14 is input to the first EDFA 36. The optical packet signal amplified by the first EDFA 36 is output to the first optical transmission path 40. The optical packet signal output from the second output port 14d of the optical switch 14 is input to the second EDFA 38. The optical packet signal amplified by the second EDFA 38 is output to the second optical transmission path 42.

The optical receiver device 12 comprises an optical/electrical converter unit 44 and a data processing unit 46. In this embodiment, the optical receiver device 12 is connected to the second optical transmission path 42. Another optical receiver device (not shown) may be connected to the first optical transmission path 40.

The optical/electrical converter unit 44 subjects the received optical packet signal to optical/electrical conversion, amplification, clock extraction, regeneration, etc. before outputting an electrical packet signal and a clock signal to the data processing unit 46.

The data processing unit 46 performs error correction using an error correction code included in the packet signal and detects a bit error rate (BER). The data processing unit 46 transmits the detected bit error rate information to the control signal generation unit 35 of the optical packet switching device 10. The bit error rate information may be transmitted using a predetermined optical supervisory channel (OSC) signal. The wavelength used in an OSC signal is different from the wavelength used in an optical packet signal.

Figure 4A:
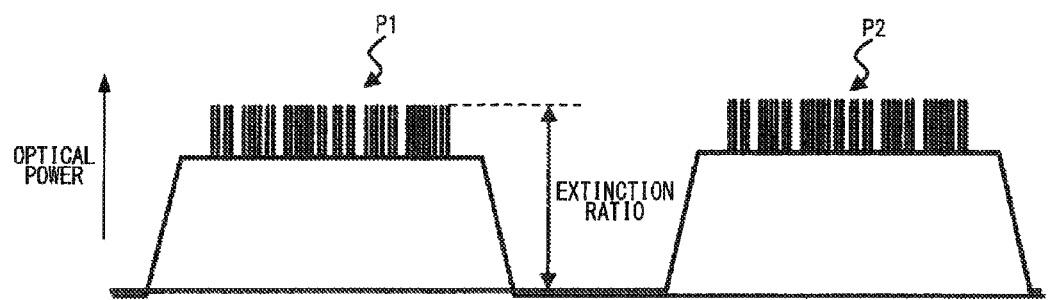
FIGS. 4A and 4B illustrate the operation of the optical packet switching system according to the first embodiment.
Figure 4B:
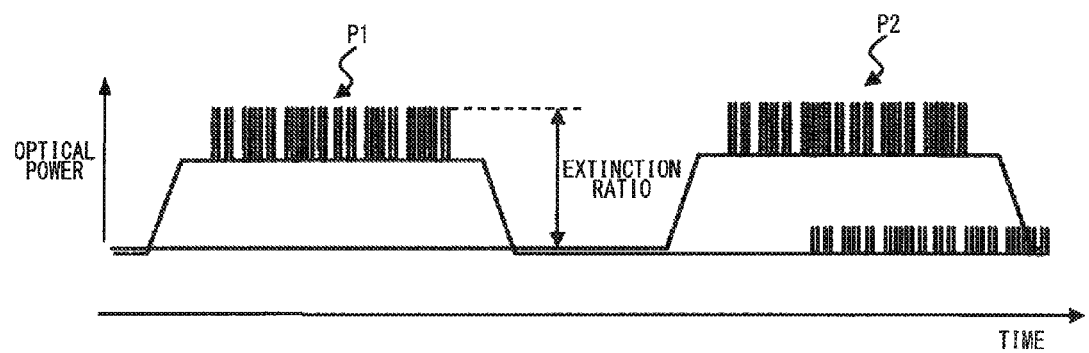

FIGS. 4A and 4B illustrate the operation of the optical packet switching system according to the first embodiment. FIG. 4A shows an optical packet signal output from the second output port of the optical switch in an ordinary optical packet switching system, by way of comparison. FIG. 4A shows that an optical packet P1 input from the first input port is output, and, after a certain gap time, an optical packet P2 input from the second input port is output. In this example, when the optical packet P1 is transmitted through the optical switch, the control signal generation unit 35 turns the second SOA gate on and turns the other SOA gates completely off. When the optical packet P2 is transmitted through the optical switch subsequently, the control signal generation unit 35 turns the fourth SOA gate on and turns the other SOA gates completely off.

Figure 1A:
FIGS. 1A and 1B are graphs comparing an optical signal in optical path transmission and an optical packet signal in optical packet transmission.
Figure 1B:
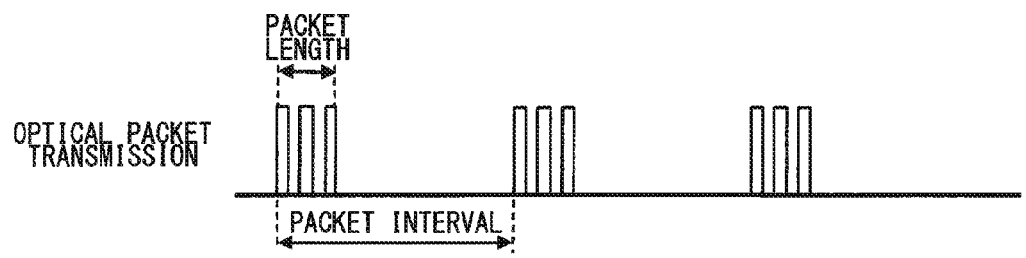
Figure 2A:
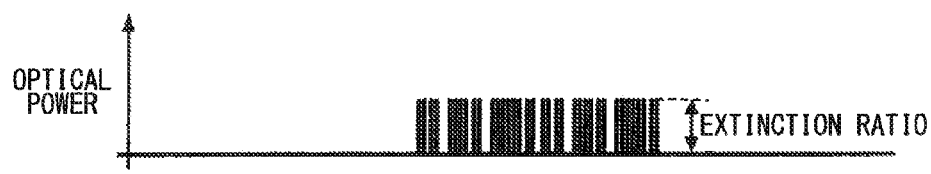
FIGS. 2A and 2B are graphs comparing extinction ratios of optical packet signals occurring before and after optical switching.
Figure 2B:
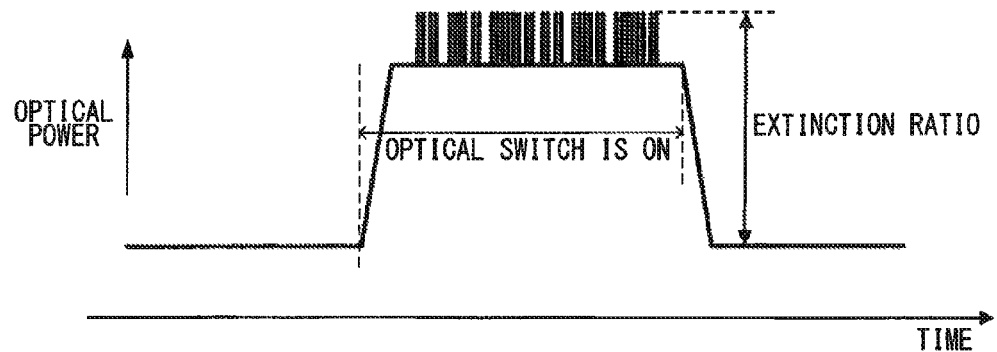

As described with reference to FIGS. 2A and 2B, the extinction ratio of the optical switch is significantly higher than that of the optical transmitter. Therefore, the extinction ratio of the optical packets P1 and P2 is significantly higher than the ratio occurring before optical packets are input. Optical packet signals characterized by such a high extinction ratio result in large variation in the average optical power and large fluctuation in the gain of an EDFA in the subsequent stage.

FIG. 4B shows an optical packet signal output from the second output port 14d of the optical switch 14 in the optical packet switching system 100 according to the embodiment. FIG. 4B also shows that an optical packet P1 input from the first input port is output, and, after certain gap time, an optical packet P2 input from the second input port is output.

In this embodiment, the control signal generation unit 35 switches optical packet signals such that a noise component is superimposed on the optical packet signal by inducing cross talk in the optical switch 14.

A specific description will be given with reference to FIG. 4B. When the optical packet P1 is transmitted through the optical switch 14, the control signal generation unit 35 turns the second SOA gate on but does not turn the other SOA gates completely off. The control signal generation unit 35 maintains the other SOA gates slightly open so as to induce cross talk. When the optical packet P2 is transmitted through the optical switch 14 subsequently, the control signal generation unit 35 turns the fourth SOA gate on but does not turn the other SOA gates completely off. The control signal generation unit 35 maintains the other SOA gates slightly open so as to induce cross talk.

Thus, optical packet signal witching according to the embodiment is such that noise is superimposed on the optical packet signal by inducing cross talk in the optical switch 14. This reduces variation in the average optical power of an optical packet signal prior to input to the optical amplifier device 11 in the subsequent stage so that fluctuation in the gain of the optical amplifier device 11 can be reduced. As a result, variation in the peak power of an optical packet signal output from the optical amplifier device 11 is mitigated so that the bit error rate characteristics of the optical receiver device 12 can be improved.

The control signal generation unit 35 may control the amount of cross talk based on the bit error rate information supplied from the optical receiver device 12. In other words, the bit error rate information is fed back to the optical packet switching device 10 to control the amount of cross talk. Excessive cross talk results in the extinction ratio of an optical packet signal becoming so low that bit errors may occur in the optical receiver device 12. Such a situation can be avoided by controlling the amount of cross talk so that the bit error rate detected in the optical receiver device 12 is equal to or below a predetermined threshold value.

Feedback control as described above may be performed when the optical packet switching system 100 is started. In this case, feedback control is performed by defining optical packet signals assumed to occur in operation to determine the amount of cross talk assumed to occur in operation. During operation, the optical switch 14 is regulated so that cross talk of the determined amount is produced. In this case, feedback control need not be performed during operation so that system load can be reduced.

Second Embodiment

Figure 5:
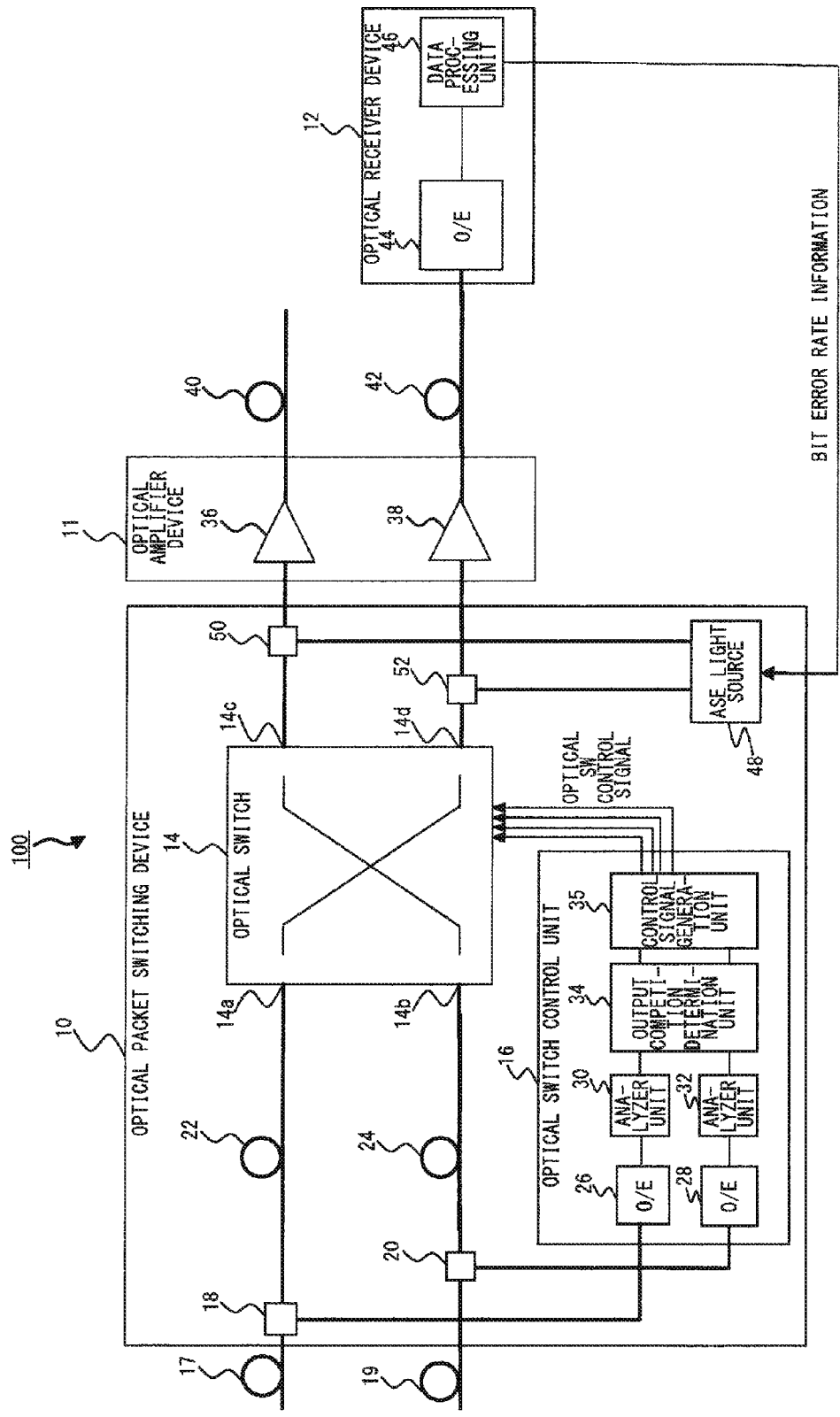
FIG. 5 shows an optical packet switching system according to the second embodiment of the present invention.

FIG. 5 shows an optical packet switching system according to the second embodiment of the present invention. Those components of the optical packet switching system 100 shown in FIG. 5 that are identical or corresponding to the components of the optical packet switching system shown in FIG. 3 are denoted by like symbols and a detailed description is omitted.

As shown in FIG. 5, the optical packet switching system 100 according to this embodiment differs from the optical packet switching system 100 shown in FIG. 3 in that an ASE light source 48 is provided. The ASE light source 48 is provided in the optical packet switching device 10 and superimposes amplified spontaneous emission (ASE) noise on optical packet signals output from the first output port 14c and the second output port 14d of the optical switch 14 via a third optical coupler 50 and a fourth optical coupler 52.

Thus, according to the embodiment, the extinction ratio of an optical packet signal prior to input to the optical amplifier device 11 is reduced by superimposing ASE noise on the optical packet signal output from the optical switch 14. This reduces variation in the average optical power of an optical packet signal prior to input to the optical amplifier device 11 so that fluctuation in the gain of the optical amplifier device 11 can be reduced. As a result, variation in the peak power of an optical packet signal output from the optical amplifier device 11 is mitigated so that the bit error rate characteristics of the optical receiver device 12 can be improved.

In an alternative approach, the ASE light source 48 may control the amount of ASE noise superimposed on the optical packet signal based on the bit error rate information detected in the optical receiver device 12. In other words, the bit error rate information is fed back to the optical packet switching device 10 to control the amount of ASE noise. Excessive ASE noise results in the extinction ratio of optical packet signals becoming so low that bit errors may occur in the optical receiver device 12. Such a situation can be avoided by controlling the amount of ASE noise so that the bit error rate detected in the optical receiver device 12 is equal to or below a predetermined threshold value.

Feedback control as described above may be performed when the optical packet switching system 100 is started. In this case, feedback control is performed by defining optical packet signals assumed to occur in operation to determine the amount of ASE noise assumed to occur in operation. During operation, the ASE light source 48 is controlled so that ASE noise volume as determined is produced. In this case, feedback control need not be performed during operation so that system load can be reduced.

Third Embodiment

Figure 6:
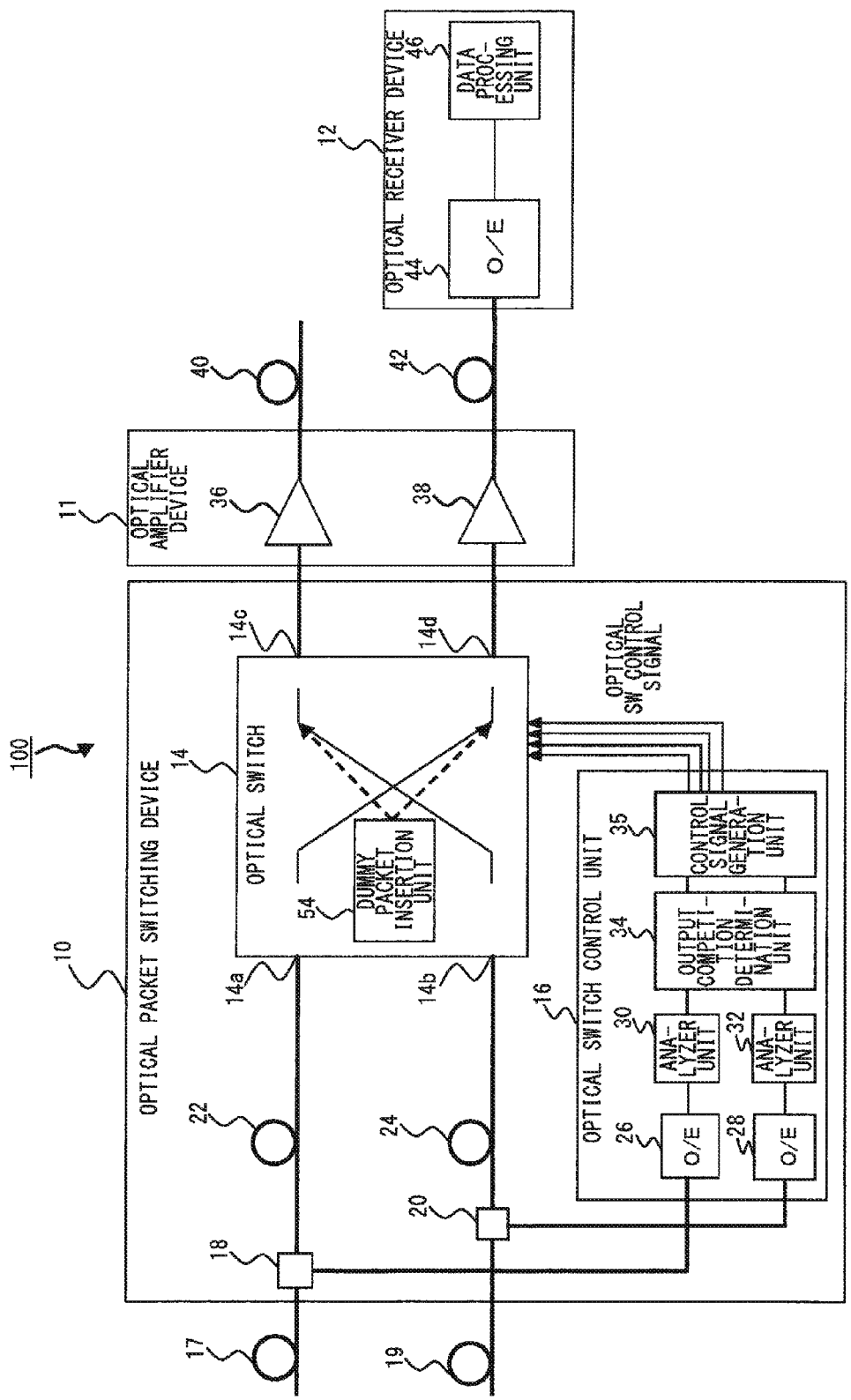
FIG. 6 shows an optical packet switching system according to the third embodiment of the present invention.

FIG. 6 shows an optical packet switching system according to the third embodiment of the present invention. Those components of the optical packet switching system 100 shown in FIG. 6 that are identical or corresponding to the components of the optical packet switching system shown in FIG. 3 are denoted by like symbols and a detailed description is omitted.

As shown in FIG. 6, the optical packet switching system 100 shown in FIG. 6 differs from the optical packet switching system shown in FIG. 3 in that a dummy packet insertion unit 54 is provided. In this embodiment, the dummy packet insertion unit 54 is provided in the optical switch 14. The dummy packet insertion unit 54 has the function of inserting a dummy packet in an optical signal in accordance with a control signal from the control signal generation unit 35.

Figure 7A:
FIGS. 7A-7C illustrate the operation of the optical packet switching system according to the third embodiment.
Figure 7B:
Figure 7C:
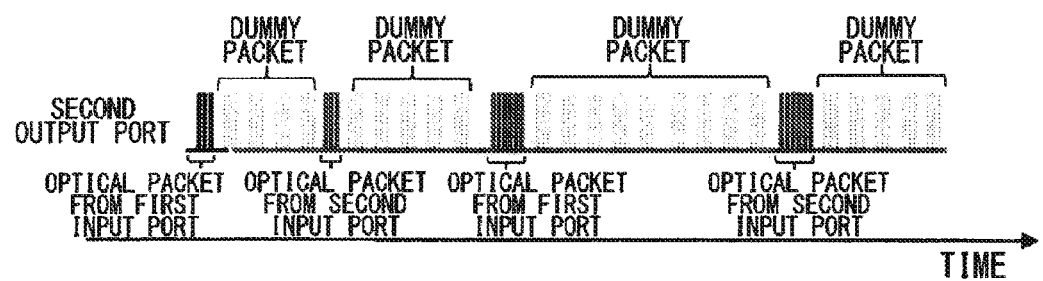

FIGS. 7A-7C illustrate the operation of the optical packet switching system according to the third embodiment. FIG. 7A shows an optical packet signal input to the first input port 14a of the optical switch 14. FIG. 7B shows an optical packet signal input to the first input port 14b of the optical switch 14. FIG. 7C shows an optical packet signal output from the second input port 14d of the optical switch 14. FIGS. 7A-7C show a case where the optical packet signal input to the first input port 14a and the optical packet signal input to the second input port 14b are both output to the second output port 14d.

In the example of FIGS. 7A-7C, the optical signal output from the second output port 14d contains idle time in which optical packets do not occur between optical packet signals. According to the embodiment, the dummy packet insertion unit 54 inserts a dummy packet between optical packet signals. This eliminates or reduces idle time in which optical packets do not occur. Therefore, variation in the average optical power of the optical signal prior to input to the optical amplifier device 11 is reduced. As a result, fluctuation in the gain of the optical amplifier device 11 is reduced and variation in the peak power of optical packet signals output from the optical amplifier device 11 is mitigated so that the bit error rate characteristics of the optical receiver device 12 can be improved.

Since dummy packets are packets that are not necessary as data, post-processing is required in respective nodes. A description will be given of post-processing of dummy packets.

An optical signal in which a dummy packet is inserted in the optical packet switching device in the optical packet switching system 100 may be input to another optical packet switching device (not shown) after being output from the optical amplifier device 11. In this case, if the dummy packet and the legitimate packet signal compete in the other optical packet switching device, the legitimate optical packet signal may be discarded.

To address this, the dummy packet insertion unit 54 assigns flag indicating a dummy packet to the start bit of the dummy packet. The optical packet switching device refers to the flag to identify a dummy packet. If the dummy packet and the legitimate packet complete, the optical packet switching device discards the dummy packet unconditionally and routes the legitimate optical packet signal. This avoids a situation in which a legitimate optical packet is discarded due to a dummy packet.

When the data processing unit 46 of the optical receiver device 12 receives an optical signal in which a dummy packet is inserted, the unit 46 identifies the dummy packet by referring to a flag and discards the dummy packet. This avoids a situation in which an unnecessary dummy packet is forwarded to the device in the subsequent stage.

Alternatively, when the optical packet switching device 10 receives an optical signal in which a dummy packet is inserted, the device 10 may discard all dummy packets for the moment before routing the optical packet signal and then insert a dummy packet again. In this case, a dummy packet can be appropriately inserted between optical packet signals so that variation in the average optical power is suitably mitigated.

Still alternatively, the optical packet switching device 10 may allow a legitimate optical packet signal to continue to accompany a dummy packet and route the dummy packet along with the legitimate optical packet signal. In other words, variation in the average optical power is mitigated by forwarding the received dummy packet as it is instead of inserting a new dummy packet. In this case, it is not necessary to provide a dummy packet insertion unit in all optical packet switching devices so that the system cost is reduced.

Described above is an explanation based on an exemplary embodiment. The embodiment is intended to be illustrative only and it will be obvious to those skilled in the art that various modifications to constituting elements and processes could be developed and that such modifications are also within the scope of the present invention.

An EDFA is described by way of example of an optical amplifier but the embodiment is non-limiting as to the type of an optical amplifier.

What is claimed is:

1. An optical packet switching system comprising:
   an optical packet switching device configured to route and output an input optical packet signal, the optical packet switching device comprising:
   an optical switch having a plurality of gates;
   a control unit for controlling on/off states of the plurality of gates; and
   a light source configured to superimpose a first noise to the output optical packet signal according to feedback provided from a light receiver device the light source being external to the optical switch,
   an erbium doped fiber amplifier (EDFA) device provided in a stage subsequent to the optical packet switching device; and
   wherein the control unit is configured to superimpose a second noise component on an optical packet signal input to the erbium doped fiber amplifier device by inducing cross talk by turning on one of the plurality of gates to output the input optical packet signal, and not completely turning off remaining gates of the plurality of gates such that they are slightly open.

2. The optical packet switching system according to claim 1, further comprising:
   wherein the light receiver device is configured to receive an optical packet signal from the erbium doped fiber amplifier device,
   wherein the light receiver device is configured to feed back bit error rate information of the received optical packet signal to the light source, and
   wherein the light source is configured to control an amount of the first noise based on bit error rate information fed back.

3. The optical packet switching system according to claim 2, wherein the light source is configured to control an amount of the first noise such that the bit error rate fed back is equal to or lower than a predetermined threshold value.

4. The optical packet switching system according to claim 1, wherein the slightly open gates are less than completely turned off gates.

5. The optical packet switching system according to claim 1, wherein the light source is an amplified spontaneous emission (ASE) light source.

* * * * *